United States Patent [19]

Job

[11] Patent Number: 4,876,230

[45] Date of Patent: Oct. 24, 1989

[54] MAGNESIUM ALKOXIDE POLYMERIZATION CATALYST BY BOILING IN ORGANIC SOLVENTS

[75] Inventor: Robert C. Job, Houston, Tex.

[73] Assignee: Shell Oil Company, Houston, Tex.

[21] Appl. No.: 240,600

[22] Filed: Sep. 6, 1988

[51] Int. Cl.$^4$ .............................................. C08F 4/64
[52] U.S. Cl. .................................. 502/171; 502/107; 502/111; 502/125; 502/133; 502/134
[58] Field of Search ............... 502/104, 107, 111, 125, 502/133, 134, 171

[56] References Cited

U.S. PATENT DOCUMENTS

| | | | |
|---|---|---|---|
| 4,400,302 | 8/1983 | Goodall et al. ...................... | 502/104 |
| 4,414,132 | 11/1983 | Goodall et al. ...................... | 502/104 |
| 4,511,669 | 4/1985 | Gessell ............................ | 502/134 X |
| 4,552,858 | 11/1985 | Imai et al. ........................ | 502/125 X |
| 4,590,240 | 5/1986 | Morguet et al. ................ | 502/134 X |
| 4,654,318 | 3/1987 | Yamamoto et al. ............ | 502/133 X |
| 4,710,482 | 12/1987 | Job ..................................... | 502/127 |
| 4,780,441 | 10/1988 | Graroff ............................. | 502/107 |

*Primary Examiner*—Patrick P. Garvin
*Attorney, Agent, or Firm*—Donald F. Haas

[57] ABSTRACT

A process is disclosed for improving the morphology of a polymerization catalyst formed from a magnesium alkoxide with bound alcohol. The process comprises treating the magnesium alkoxide with an unreactive solvent at or above the temperature at which the alcohol dissociates from the alkoxide prior to subjecting the magnesium alkoxide to metathesis.

6 Claims, No Drawings

4,876,230

MAGNESIUM ALKOXIDE POLYMERIZATION CATALYST BY BOILING IN ORGANIC SOLVENTS

BACKGROUND OF THE INVENTION

This invention relates to the production of olefin polymers by polymerization with a magnesium alkoxide polymerization catalyst. More particularly, the present invention relates to the improvement of the morphology, and sometimes productivity, of polmerization catalysts formed from magnesium alkoxides having alcohol solvate.

Experience has shown that the best magnesium chloride supported titanium tetrahalide catalysts for olefin polymerization are prepared via metathesis of a suitable magnesium compound rather than forceful mechanical and chemical treatment of magnesium chloride. Very good commercial polymerization catalysts have been prepared via metathesis of magnesium alkoxide using titanium tetrachloride in the presence of an ester and, optionally, a halohydrocarbon as disclosed in U.S. Pat. Nos. 4,400,302 and 4,414,132. Many of these magnesium alkoxides have bound alcohol (alcohol solvate) which I believe should be removed in order to make a good catalyst. For instance, magnesium methoxide does not metathesize well because, as the initially formed solvate methanol is thermally removed, it may catalyze the polymerization to the intractable $[Mg(OMe)_2]_n$ species. When bound alcohol is removed from magnesium alkoxides in a haphazard fashion such as by heating in an inert atmosphere, the resulting catalyst generally exhibits inferior morphology. It is an object of the present invention to provide a method for removing the bound alcohol from magnesium alkoxides which allows the production of a catalyst with superior morphology.

SUMMARY OF THE INVENTION

The present invention is a process for improving the morphology of a polymerization catalyst formed from a magnesium alkoxide which has bound alcohol. The process comprises treating the magnesium alkoxide with an unreactive solvent at or above the temperature at which the alcohol dissociates from the alkoxide prior to subjecting the magnesium alkoxide to metathesis to form the procatalyst for the polymerization catalyst.

DETAILED DESCRIPTION OF THE INVENTION

Due to the common method of manufacture, many magnesium alkoxides have bound alcohol. As explained above, bound alcohol can interfere with the metathesis reaction of the magnesium alkoxide with a halide such as titanium tetrahalide, preferably titanium tetrachloride, to form magnesium chloride which is used as a support material in a procatalyst for an olefin polymerization catalyst. Magnesium methoxide is a good example of one such magnesium alkoxide - $Mg(OMe)_2 \cdot 4MeOH$. Another example is $Mg_4(OCH_3)_6(CH_3OH)_{10}X_2$ wherein X is a counter ion or ions with a total charge of $-2$; for example, it may be Cl, Br, methacrylate, butyrate, acrylate, acetate, resorcinolate, 2,4-pentanedionate, propionate, benzoate or chloroacetate.

When bound alcohol is removed by heating alone, the morphology of the catalyst and the polymer produced therefrom is poor. I have found that when the bound alcohol is removed by heating the magnesium alkoxide in an unreactive solvent at a temperature at or above the temperature at which the alcohol dissociates from the alkoxide prior to subjecting the magnesium alkoxide to metathesis, the problems of bound alcohol are eliminated and the morphology of the catalyst in the polymer produced therefrom is excellent.

If the temperature utilized is lower than the temperature at which the alcohol dissociates from the Mg alkoxide, then alcohol will be left in the magnesium alkoxide to cause the problems discussed above and thus decrease the value of the catalyst produced from the magnesium alkoxide. Ethanol, for instance, will dissociate from Mg ethoxide at about 105° C. in the absence of a solvent or in the presence of a higher boiling point solvent. The use of a solvent is important to achieve good catalyst morphology. The solvent chosen when the alcohol is ethanol should have a boiling point no lower than 105° C. The boiling point will be different for different bound alcohols.

The only exceptions to the above temperature requirements are when lower boiling solvents, such as cyclohexane and kerosene which form lower boiling azeotropes with alcohols, especially methanol, are used. An azeotrope is preferred because it binds up the alcohol and thus helps to lessen other disadvantages such as catalysis of the polymerization of magnesium alkoxide to species which are difficult to metathesize. The removal of the alcohol should be carried out as quickly as possible to reduce its negative effects, i.e. in the case of methanol, the degree of polymerization to $[Mg(OMe)_2]_n$.

The unreactive solvent used in the present invention may be any solvent which does not adversely affect the magnesium alkoxide and which will remove alcohol therefrom. Other suitable solvents include isooctane, decalin, toluene, xylene, decane and tetralin. Tetraethoxysilane is a suitable unreactive solvent when the alkoxide is Mg ethoxide but not when it is Mg methoxide.

ILLUSTRATIVE EMBODIMENT I

Magnesium methoxide solutions (12%) were prepared by dissolving magnesium metal, by incremental addition, into methanol which contained 0.125 equivalents of tetramethoxy silane as a stabilizer. Crystalline $Mg(OMe)_2 \cdot 4MeOH$ was prepared by slow precipitation from stabilized magnesium methoxide solutions which had been concentrated by boiling. Pure magnesium methoxide was prepared from $Mg(OMe)_2 \cdot 4MeOH$ by removal of methanol solvate by drying in a stream of warm nitrogen (to obtain a non-boiled precursor) and also by azeotropic distillation from kerosene (190° boiling point).

Catalysts were prepared by stirring 50 to 60 mmols of the appropriate magnesium compound with 2.5 ml of isobutyl phthalate in 200 ml of 50/50 titanium tetrachloride/chlorobenzene for 1 hour at 115° C. followed by two washes at 115° C. with that same solvent mixture. Excess titanium was removed by exhaustive isopentane rinses and the catalyst was dried under moving nitrogen at 40° C. The catalysts were used to polymerize propylene for 1 hour at 67° C. in a 1 gallon autoclave reactor in the liquid phase using a mixture of triethylaluminum and diisobutyldimethoxysilane as cocatalyst.

The catalyst which was made from the nitrogen dried $Mg(OMe)_2 \cdot 4MeOH$ (which is a technique which is outside the scope of this invention) had a productivity of only 7.6 kg of polypropylene per gram of catalyst/hr, xylene solubles of 8.1% and a bulk density of 0.34 grams per cubic centimer. The catalyst which was made from Mg(OMe)$_2$.4MeOH which was desolvated by boiling in kerosene had a productivity of 29.1 kg of polypropylene per gram of catalyst/hr, xylene solubles of 4.5% and a bulk density of 0.43 grams per cubic centimeter and significantly fewer fine particles (those less than 120μ). Thus, it is clearly shown that boiling in the organic solvent, kerosene, dramatically increased the productivity of the catalyst, decreased the xylene solubles and improved the morphology of the catalyst as evidenced by an increase in the bulk density and lower fines content.

ILLUSTRATIVE EMBODIMENT II (a) Non-boiled: 50 mmols of Mg$_4$(OCH$_3$)$_6$(CH$_3$OH)$_{10}$Cl$_2$ and 2.5 ml of isobutylphthalate were slurried in 200 ml of a 50:50 solution of titanium tetrachloride and chlorobenzene. This mixture was heated to 60° C. for 10 minutes and then heated to 110° C. After 50 minutes, the mixture was filtered and to the filtrate was added another 200 ml of the 50:50 solution, which also contained 0.26 ml of ethylbenzoate, and stirring was resumed for 90 minutes at 110° C. After filtration, the solids were washed once more with a fresh 50:50 solution of titanium tetrachloride and chlorobenzene for 90 minutes at 110° C. The solution was then filtered and the solids were washed 6 times with 150 ml of isopentane and then dried under moving nitrogen at 40° C.

0.56 mmols of triethylaluminum, 0.14 mmols phenyltriethoxysilane and 0.008 mmols (based on titanium) of the above catalyst were used to polymerize liquid propylene for 2 hours at 67° C. in a 1 gallon autoclave. The polypropylene product was composed of irregular broken particles and the productivity of the catalyst was 909 Kg polypropylene per gram titanium.

(b) Solvent boiled: Next, a catalyst was prepared according to the present invention. The same procedure was used except that the 50 mmols of the magnesium alkoxide was first heated in 150 ml of isooctane under gentle nitrogen bubbling for 60 minutes at about 98° C. and filtered before it was treated with the titanium tetrachloride/chlorobenzene solution containing isobutyl phthalate.

This catalyst was used to polymerize polypropylene according to the procedure set forth above. The productivity of the catalyst was 1213 Kg polypropylene/gram of titanium. There were no fines (particles less than 120 microns). The polymer exhibited retention of the morphology of the magnesium alkoxide morphology since a dodecahedral polymer was produced. This morphology is greatly preferred over the broken powder.

ILLUSTRATIVE EMBODIMENT III (a) Non-boiled: The procedure of the first paragraph of Illustrative Embodiment II was utilized to make a polymerization catalyst with the exception that the magnesium alkoxide was 9.5 grams of Mg$_4$(OCH$_3$)$_6$(CH$_3$OH)$_{10}$Br$_2$ and 0.3 ml of phthaloyl chloride was substituted for ethylbenzoate. The polymerization was carried out with this catalyst according to the procedure of the second paragraph of Illustrative Embodiment II. The productivity of the catalyst was 1018 Kg of polypropylene per gram of titanium and the polymer morphology was broken particles.

(b) Solvent boiled: A catalyst was made according to the present invention by subjecting the above magnesium alkoxide to heating in 150 ml of isooctane under gentle nitrogen bubbling for 60 minutes at about 98° C. This solution was filtered and the magnesium alkoxide was used to produce a catalyst according to the procedure of the preceding paragraph. This catalyst was used to polymerize propylene according to the above polymerization procedure. The productivity of the catalyst was 327 Kg of polypropylene per gram of titanium. However, the polymer exhibited perfect dodecahedral morphology. Thus, the morphology advantages of the invention were achieved. It is theorized that the productivity decrease observed with alkoxy bromide occurs because, upon heating, bromide is less adept than chloride at preventing polymerization to [Mg(OMe)$_2$]$_n$ which is extremely stable and will not metathesize very easily.

ILLUSTRATIVE EMBODIMENT IV (a) Non-boiled: Magnesium powder (50 mesh, 10 g, 0.41 mol) was slurried in 50 g of tetraethoxysilane (TEOS) then 100 g of ethanol was added. Ferric chloride (1.9 mmol, 16% solutioin in ethanol) was added and the mixture slurried once more, then allowed to stand at room temperature. After standing overnight, the voluminous granular precipitate was washed on a fritted glass funnel with three portions of isooctane and dried under moving nitrogen to yield a granular grey solid of about 200 micron average particle size. The precursor (8.2 g) was slurried in 200 ml of 50/50 (vol/vol) TiCL$_4$/chlorobenzene , then isobutyl phthalate (2.5 ml, 8.5 mmol) was added at room temperature. The gently stirring mixture was heated to 110° C. and held for 1 hour. The mixture was filtered hot and then another 200 ml of the TiCl$_4$/chlorobenzene mixture was added along with phthaloyl chloride (0.42 ml, 2.9 /mmol) and ethyl benzoate (0.37 ml, 2.6 mmol) and, with gentle stirring, the slurry was held at 110° C. for another 1.0 hour and filtered hot. The solids were slurried in one final 200 ml portion of the TiCl$_4$/chlorobenzene solvent mix and stirred gently for 0.5 hour at 110° C. The mixture was filtered hot and then allowed to cool to 40° C. before being washed with six 150 ml portions of isopentane. The resulting magnesium ethoxide was dried for 100 minutes under moving nitrogen at 40° C.

(b) Solvent boiled: Next, a catalyst was prepared according to the present invention. Magnesium powder (50 mesh, 6.1 g, 0.25 mol) was slurried in 85 g of ethanol, then 0.24 g of bromine (3.0 mmol) and 1.7 mmol of 16% ethanolic ferric chloride were added. After effervescence had become vigorous, 55 g of toluene was added and the mixture was placed into a 45° C. oil bath and stirred vigorously. After 3 hours, 225 g of tetraethoxysilane was added and the rapidly stirring mixture was slowly heated to a pot temperature of 153° C. at which point heating was stopped. The vessel was capped and the slurry was allowed to cool with rapid stirring. The mixture was filtered and the solids washed three times with isooctane then dried under moving nitrogen. The yield was 28.8 g (100% of theory). Microscopic examinatin revealed transparent particles in the 10 to 35 micron range with the average particle size about 17 microns. The TiCl$_4$/chlorobenzene/ester treatment was carried out as described in part (a) of this embodiment.

The catalysts were used to polmerize propylene for 2 hours at 67° C., in liquid propylene in a 1 gallon reactor, using a mixture of triethylaluminum and diphenyldimethoxysilane as cocatalyst. The catalyst from the non-boiled precursor produced 36 Kg PP/g catalyst with an average particle size of 1344 micron (whereas an average particle size of 6600 micron was expected on the basis of average precursor particle size). The catalyst prepared according to this invention produced 63.2 Kg PP/g catalyst with an average particle size of 494 micron (where an average of 500 micron was expected). Thus, it is clearly shown that boiling in the organic solvent, tetraethoxysilane, dramatically increased the productivity of the catalyst and improved the morphology (as evidenced by obtaining polymer of predicted average particle size as opposed to only 20% of predicted particle size via the catalyst from the non-boiled precursor).

I claim as my invention:

1. A process for improving the morphology and/or productivity of a polymerization catalyst formed from a magnesium alkoxide with bound alcohol, which comprises treating said magnesium alkoxide with an unreactive solvent at or above the temperature at which the alcohol dissociates from the alkoxide prior to subjecting said magnesium alkoxide to metathesis.

2. The process of claim 1 wherein the alcohol is ethanol and the temperature is at least about 105° C.

3. The process of claim 1 wherein the solvent is selected from the group consisting of kerosene, cyclohexane, isooctane, decalin, tetralin, toluene and xylene.

4. The process of claim 1 wherein the magnesium alkoxide is selected from the group consisting of magnesium methoxide, magnesium ethoxide and $Mg_4(OCH_3)_6(CH_3OH)_{10} X_2$ wherein X is a counter ions or ions with a total charge of $-2$.

5. The process of claim 4 wherein the magnesium alkoxide is magnesium ethoxide and the solvent is tetraethoxysilane.

6. The process of claim 1 wherein the solvent forms an azeotrope with the bound alcohol.

* * * * *